Patented Jan. 11, 1949

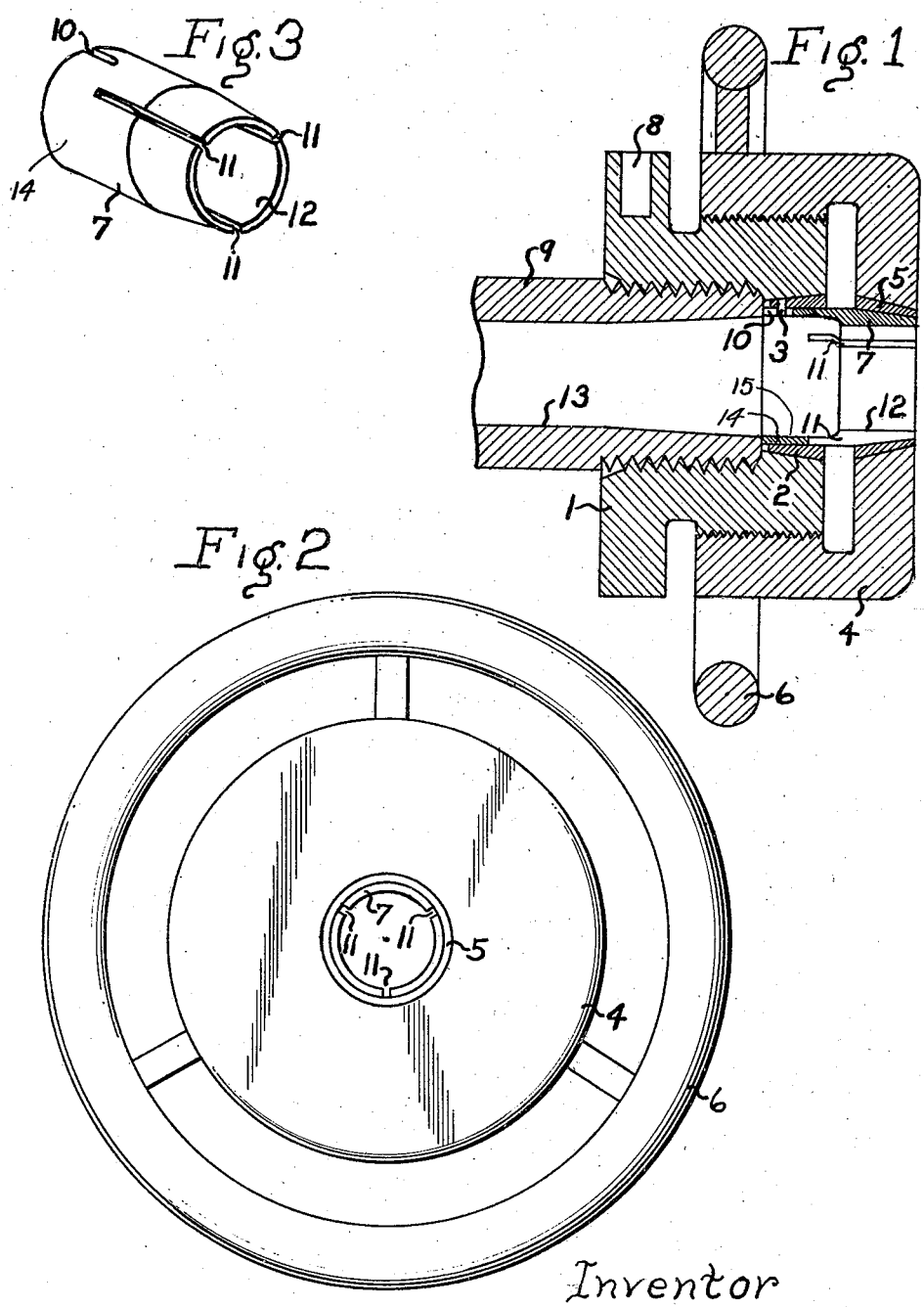

2,458,889

UNITED STATES PATENT OFFICE 2,458,889

COLLET CHUCK

Donald Wilbur Bloomquist, Chicago, Ill.

Application June 24, 1946, Serial No. 678,731

3 Claims. (Cl. 279—56)

The invention relates to improvements in collet chucks in which the entire collet chuck unit is mounted on the spindle nose of the machine; and the objects of the improvement are, first, to allow the full diameter of the spindle bore of the machine to be utilized; and, second, to provide improved facilities for closing and opening the collets.

One form of the invention is illustrated in the accompanying drawing, in which Figure 1 is a vertical section of the entire collet chuck; Figure 2, a front plan view of the entire collet chuck; and, Figure 3, a detailed view in prospective of the collet only.

The threaded backplate 1, carrying a hardened, ground, tapered sleeve 2 and having an alignment pin 3 inserted in sleeve 2; the force-cap 4 threaded onto the backplate 1, carrying a hardened, ground, tapered sleeve 5 and having a handwheel 6 as an integral part, constitute the framework of the chuck. The hardened and ground collet (or collets) 7 is held in alignment, within the chuck, by the tapered sleeves 2 and 5 referred to hereinafter. See Fig. 1 and Fig. 2.

The backplate 1 has one or more holes 8 to accommodate a bar, to provide one means of tightening (or removing) the chuck on the spindle nose 9 of the machine. See Fig. 1.

Turning inward on the handwheel 6 causes the force-cap 4 and the tapered sleeve 5 to bear upon the tapered end of the collet 7. The collet 7 is subjected to two opposing compression forces; one, the collet 7 inner end bearing against the spindle nose 9 of the machine, and, two, the collet 7 outer tapered end bearing into the tapered sleeve 5, which forces the collet 7 to close.

Turning the handwheel 6 outward releases the two above described compression forces upon the collet 7. The collet 7 being of hardened (tempered) metal has some amount of resilience and expands (reopens).

The collet 7 has in its rearward cylindrical portion 14, a slot 10 which loosely engages pin 3 and prevents the collet 7 revolving when the handwheel 6 and the force-cap 4 and the sleeve 5 are tightened (or loosened) upon the collet 7. The collet 7 has the three conventional slots 11, 11, 11 which permit closing. See Fig. 1, Fig. 2, and Fig. 3. The collet 7 has a chucking front bore 12 merging with a rearwardly positioned bore 15, in the said cylindrical portion 14.

The collet (or collets) 7 may be as large in internal diameter bore 12 as the internal bore 13 of the spindle 9 of the machine. Or the collet (or collets) 7 may be of any smaller standard size bore, or any smaller odd size bore. Or the collet (or collets) 7 may be of any larger internal diameter bore than the internal bore 13 of the spindle 9 of the machine. See Fig. 1 and Fig. 3.

The section of spindle 9 of a power machine shown in the drawing; and the part of a power machine not shown in the drawing forming no part of the present invention.

I am aware that prior to my invention drawn-in-collets (collet chucks) have been used as attachments for power machinery. I therefore do not claim such a combination broadly; but I claim:

1. The combination, in a collet chuck, of a threaded backplate adapted to be threadably secured to the nose of a lathe spindle and having a tapered alignment sleeve and an alignment pin fitted thereinto, a threaded force-cap threadably secured to the said backplate and having a frusto-conical alignment sleeve fitted thereinto, the said force-cap being further provided with an integral handwheel portion, and a tapered collet having a body defining a shoulder portion resting against the nose of the said spindle and provided with a keyway removably and interchangeably engaging the said alignment pin to prevent rotation of the said collet when the said force-cap is rotated, the said body of the said collet being removably confined between the free end of the nose of the said spindle and the said alignment sleeves.

2. The combination, in a collet chuck, of a threaded backplate adapted to be threadably secured to the nose of a lathe spindle and having a tapered alignment sleeve and an alignment pin fitted thereinto, a threaded force-cap threadably secured to the said backplate and having a frusto-conical alignment sleeve fitted thereinto, the said force-cap being further provided with an integral handwheel portion, and a tapered collet having a body defining a shoulder portion resting against the nose of the said spindle and provided with a keyway removably and interchangeably engaging the said alignment pin to prevent rotation of the said collet when the said force-cap is rotated, the said body of the said collet being removably confined between the free end of the nose of the said spindle and the said alignment sleeves, the bore in the said spindle flaring outwardly, the said collet being provided with a front bore adapted to clamp a piece of stock to be operated upon, the said front bore merging with a rear bore in the said collet, the said rear bore being of a diametral magnitude at least equivalent to that of the flared out portion of the bore in the said spindle at its face.

3. A collet comprising a body having tapered and slotted clamp means at its front portion, a cylindrical rear portion merging with the said front portion, a chucking front bore in the said clamp means, a larger bore in the said cylindrical rear portion communicating with the said first-mentioned bore, and keyway means at the said rear portion engageable by a key to prevent rotation of the said collet.

DONALD WILBUR BLOOMQUIST.

REFERENCES CITED

The following references are of record in the file of this patent:

UNITED STATES PATENTS

| Number | Name | Date |
|---|---|---|
| 990,087 | Whitehead | Apr. 18, 1911 |
| 1,278,427 | Bocorsilski | Sept. 10, 1918 |
| 1,403,415 | Iggberg | Jan. 10, 1922 |
| 1,570,251 | Hoagland | Jan. 19, 1926 |
| 1,987,504 | Denz | Jan. 8, 1935 |
| 2,272,185 | Chittenden | Feb. 10, 1942 |
| 2,359,507 | Bell | Oct. 3, 1944 |

FOREIGN PATENTS

| Number | Country | Date |
|---|---|---|
| 295,908 | Great Britain | 1928 |

OTHER REFERENCES

Article from Popular Mechanics of Feb. 1945, p. 119 (Copy of which is in 279–40, Division 52).